(12) United States Patent
Pausch et al.

(10) Patent No.: US 8,232,530 B2
(45) Date of Patent: Jul. 31, 2012

(54) SOLID STATE NEUTRON DETECTOR

(75) Inventors: Guntram Pausch, Dresden (DE); Juergen Stein, Wuppertal (DE)

(73) Assignee: ICx Technologies GmbH, Solingen (DE)

( * ) Notice: Subject to any disclaimer, the term of this patent is extended or adjusted under 35 U.S.C. 154(b) by 0 days.

(21) Appl. No.: 12/067,903

(22) PCT Filed: Mar. 5, 2007

(86) PCT No.: PCT/EP2007/052063
§ 371 (c)(1),
(2), (4) Date: Sep. 24, 2009

(87) PCT Pub. No.: WO2008/107017
PCT Pub. Date: Sep. 12, 2008

(65) Prior Publication Data
US 2010/0181488 A1    Jul. 22, 2010

(51) Int. Cl.
*G01T 1/20* (2006.01)
(52) U.S. Cl. ............... 250/370.11; 250/370.13
(58) Field of Classification Search ............. 250/370.11
See application file for complete search history.

(56) References Cited

U.S. PATENT DOCUMENTS 3,566,118 A * 2/1971 Peters ........................... 250/367
5,446,288 A * 8/1995 Tumer ......................... 250/390.05
(Continued)

FOREIGN PATENT DOCUMENTS
RU       94020227 A1    4/1996
(Continued)

OTHER PUBLICATIONS

Syntfeld A., et al, "LiI(Eu) in Neutron and gamma-ray Spectrometry—a High Sensitive Thermal Neutron Detector," Nuclear Science Symposium Conference Record, 2004 IEEE Rome, Italy, Oct. 16-22, 2004, pp. 1545-1550, IEEE, Piscataway, NJ, USA.

(Continued)

*Primary Examiner* — David Porta
*Assistant Examiner* — Hugh H Maupin
(74) *Attorney, Agent, or Firm* — IP Strategies

(57) ABSTRACT

The invention relates to a neutron detector for detection of neutrons in fields with significant γ- or β-radiation, comprising a neutron sensitive scintillator crystal, providing a neutron capture signal being larger than the capture signal of 3 MeV γ-radiation, a semiconductor based photo detector being optically coupled to the scintillator crystal, where the scintillator crystal and the semiconductor based photo detector are selected so that the total charge collection time for scintillator signals in the semiconductor based photo detector is larger than the total charge collection time for signals generated by direct detection of ionizing radiation in the semiconductor based photo detector, the neutron detector further comprising a device for sampling the detector signals, a digital signal processing device, means which distinguish direct signals from the semiconductor based photo detector, caused by γ- or β-radiation and being at least partially absorbed in the semiconductor based photo detector, from light signals entering the semiconductor based photo detector, after being emitted from the scintillator crystal after capturing at least one neutron, by means of pulse shape discrimination, utilizing a difference between the total charge collection time for scintillator signals from the total charge collection time for signals generated by direct detection of ionizing radiation in the semiconductor based photo detector, and means which distinguish neutron induced signals from γ-radiation induced signals in the scintillator crystal by discriminating the different signals via their pulse height, making use of the difference between the number of photons generated by neutron and γ-radiation in the field of interest.

12 Claims, 2 Drawing Sheets

U.S. PATENT DOCUMENTS

| | | | |
|---|---|---|---|
| 5,936,246 A | 8/1999 | Skinner | |
| 7,635,848 B2 * | 12/2009 | Nelson | 250/370.11 |
| 2005/0127300 A1 * | 6/2005 | Bordynuik | 250/361 R |
| 2007/0295915 A1 * | 12/2007 | Kramer et al. | 250/390.11 |

FOREIGN PATENT DOCUMENTS

| | | |
|---|---|---|
| RU | 2119178 C1 | 9/1998 |

OTHER PUBLICATIONS

Syntfeld et al., "LiI(Eu) in Neutron and gamma-ray Spectrometry—a High Sensitive Thermal Neutron Detector", Nuclear Science Symposium Conference Record, 2004 IEEE Rome, Italy, Oct. 16-22, 2004, pp. 1545-1550, XP010819062, ISBN: 0-7803-8700-7.

* cited by examiner

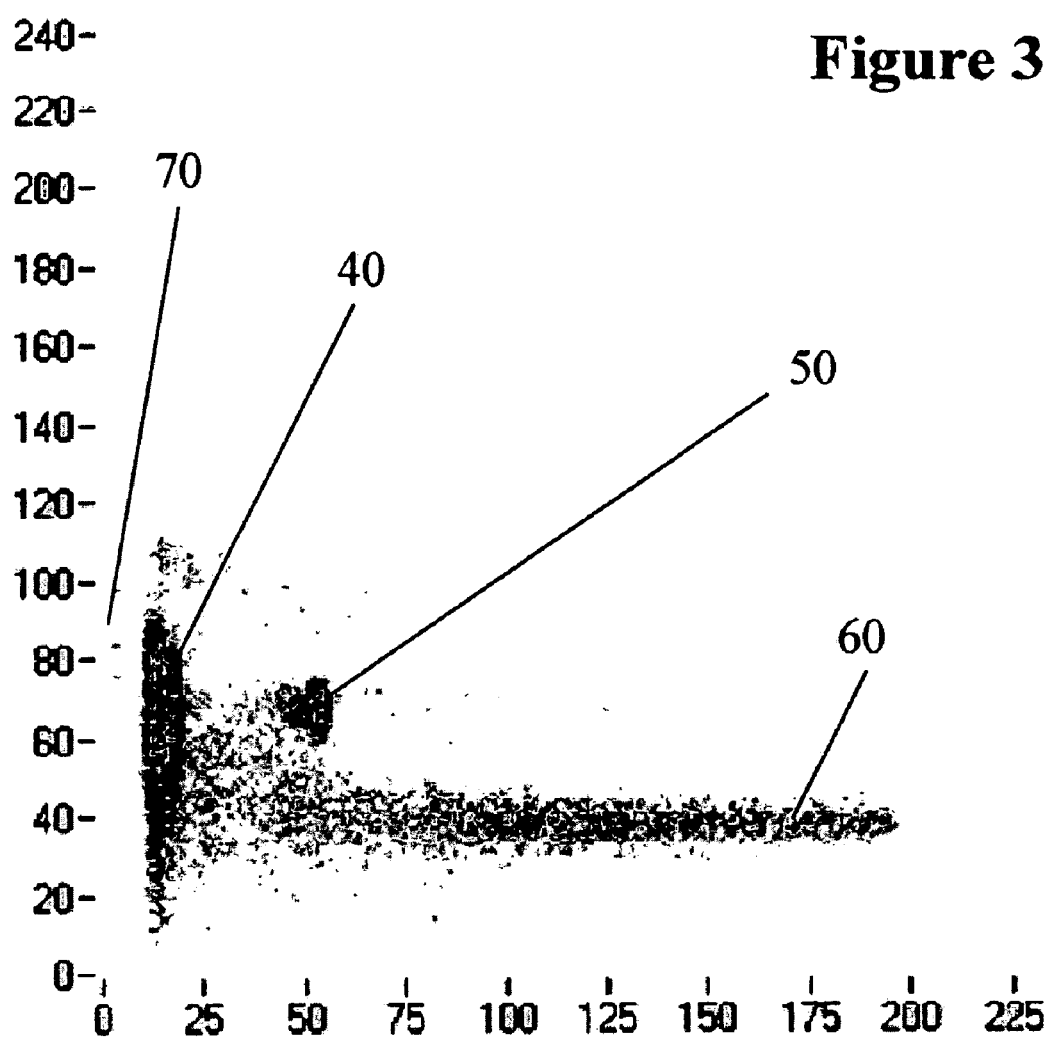

SOLID STATE NEUTRON DETECTOR

FIELD OF THE INVENTION

The invention relates to a solid state neutron detector for detection of neutrons in fields with significant γ-, including x-ray and/or β-radiation.

BACKGROUND OF THE INVENTION

The measurement and counting of neutrons is a highly significant problem. Neutrons are for example emitted by special nuclear materials like reactor and/or weapons grade plutonium whereas such materials often do not emit other radiation which can penetrate thick shieldings. Therefore, neutron detection may provide indications or even evidence for the presence of such nuclear materials.

According to ANSI standards, handheld devices for nuclide identification, which are for example used at boarder crossings, are required to comprise a neutron detector. Measurement of neutrons is further of importance in dosimetry, performed in laboratories and nuclear facilities.

As neutrons do not ionize matter, all known neutron detectors are based on reactions between a neutron and another nuclide, thereby generating secondary charged particles or γ-radiation. Therefore the standard detection process typically consists of two steps: neutron conversion, that is the generation of secondary radiation in a converter medium, for example by neutrons scattering or neutron induced reactions like nuclear fission, direct nuclear reactions, neutron capture followed by γ- or charged particle emissions or the like. Afterwards, this secondary radiation is measured with usual nuclear radiation detectors in a 'detection medium'.

In order to detect neutrons, both processes can be spatially separated, that is converter and detection media are different, or not, namely when the converter medium is the detection medium at the same time.

The detection medium is necessarily sensitive to ionizing radiation. Therefore, if neutrons must be detected in mixed fields, for example in an environment with elevated γ-radiation, the discrimination of neutron against other signals is of major importance. Therefore, neutron detectors in handheld isotope identification devices must not detect γ-radiation from any radionuclide which may be present. Even in the case of strong γ-source, the γ-radiation must not generate false neutron alarms.

The most common thermal neutron detector applied almost wherever robustness is an issue, is a proportional counter filled with $^3$He gas. $^3$He is at the same time the converter and the detection medium.

A big disadvantage of such kind of detectors is the neutron detection efficiency. This is approximately proportional to the product of volume and gas pressure. Therefore, such a detector either has to have a large volume or the gas has to be stored under high pressure. As a consequence, the detector can either not be utilized in handheld identification devices because of its large volume or the transportability of such a handheld device is limited, as high pressure devices may be subject to transport regulations like in airplane transportation.

As a matter of principle, neutron detectors with solid converter media are more appropriate when considering the detection efficiency per volume, at the same time not encountering any problems with high pressure gas devices. Such solid media detectors are often scintillator crystals, comprising lithium ($^6$Li), cadmium (Cd), Boron ($^{10}$B) or other neutron converters. Such a scintillator crystal is called "neutron scintillator". Such a neutron scintillator is for example $^6$LiI (Eu), as described in Knoll, Radiation Detection and Measurement, 3$^{rd}$ Edition 2000, page 517.

In such a crystal, the $^6$Li captures the thermal neutron, thereby generating a tritium ($^3$H) ion and an α-particle with a combined energy of roughly 4.8 MeV. Due to the relatively low quenching of this $^6$LiI(Eu) crystal, the light signals following neutrons capture correspond to signals which would be generated by γ-radiation with an energy of more than 3 MeV.

As all relevant radionuclides do not emit γ-radiation with such high energies, the light signals, being emitted from the $^6$LiI(Eu) scintillator crystal can be separated by energy discrimination.

The disadvantage of this prior art is that those detectors have to be used in combination with photomultipliers as light detectors. Other light detectors, namely semiconductor based photo detectors, are sensitive for γ-radiation also, thus acting as γ-detectors themselves generating a much larger signal per unit of deposited γ-energy as in comparison with neutron hits in the scintillator. This is due to the fact that the γ-energy deposed in the scintillator is first translated in a light pulse, only within in a second step generating photo electrons in the semiconductor based photo detector.

As a consequence, a pulse height analysis may be able to distinguish the neutron capture signals from the γ-hits in the scintillator, but not between neutron capture signals in the scintillator from γ- or x-ray hits with much lower energy directly deposed in the semiconductor based photo detector.

Therefore, such a detector could only be used for the detection of neutrons in a surrounding, where more or less no γ-radiation is present. As such surroundings are, at least outside a laboratory, not the surroundings which are of some practical relevance, this is not an option.

BRIEF SUMMARY OF THE INVENTION

It is therefore the object of the invention to provide a very compact neutron detector for avoiding the disadvantages of the prior art, especially avoiding having to make use of a high pressure gas device. This problem is solved by a neutron detector according to claim 1. Preferred embodiments are disclosed in the dependent claims.

The invention provides a neutron detector for detection of neutrons in fields with significant γ- or β-radiation, comprising a neutron sensitive scintillator crystal, providing a neutron capture signal being larger than the capture signal of 3 MeV γ-radiation. In addition, it comprises a semiconductor based photo detector being optically coupled to the scintillator crystal, where the scintillator crystal and the semiconductor based photo detector are selected so that the total charge collection time for scintillator signals in the semiconductor based photo detector is larger than the total charge collection time for signals generated by direct detection of ionizing radiation in the semiconductor based photo detector.

The total charge collection time here means the time which is needed to collect all charge carriers forming the detector signal at the collecting electrode of the photo detector, measured from the onset of the signal (first charge carriers arrive at the collecting electrode).

This total charge collection time corresponds to the rise time of a charge signal, or the length of the current signal measured at the collecting electrode. In case of direct interactions of ionizing radiation with the photo detector material the total charge collection time is defined only by the drift paths and the drift velocities of charge carriers in the semiconductor, and the geometry of the charge collecting electrode. The initial spatial distribution of generated charge carriers corresponds to an ionization track.

In case Of scintillator signals the charge carriers are generated as photo electrons, located close to the surface of the photo detector and distributed over the full area exposed to the scintillator light. The charge collection time may be very different from that of an ionization track, in particular if the photo detector is a Silicon Drift Detector (SDD). Here, the spatial spread of the photoelectrons is reflected in a spread of arrival times at the collecting electrode which is much larger than that of the localized charge corresponding to an ionization track.

Furthermore, the duration of the light pulse of the scintillator, given by the light decay, may contribute significantly to the total charge collection time. The total charge collection time is then defined by a combination of both effects.

Examples of such arrangements are a scintillator with a light decay time larger than the typical charge collection time in a photo diode (PD) or avalanche photo diode (APD), coupled to a PD or APD.

An alternative is to use a scintillator with either a long or a short light decay time coupled to a Silicon Drift Detector (SDD), as the SDD has a relatively short total charge collection time for the charge tracks generated by ionizing radiation in the Silicon but a much larger total charge collection time for the dispersed cloud of photoelectrons due to a scintillation event.

Furthermore, there is a device for sampling the detector signals and a digital signal processing device available, as well as means which distinguish direct signals from the semiconductor based photo detector, caused by γ- or β-radiation and being at least partially absorbed in the semiconductor based photo detector, from light signals entering the semiconductor based photo detector, after being emitted from the scintillator crystal after capturing at least one neutron, by means of pulse shape discrimination, utilizing a difference between the total charge collection time for scintillator signals from the total charge collection time for signals generated by direct detection of ionizing radiation in the semiconductor based photo detector. The detector also comprises means which distinguish neutron induced signals from γ-or β-radiation induced signals in the scintillator crystal by discriminating the different signals via their pulse height, making use of the difference between the number of photons generated by neutron and γ-radiation in the field of interest.

In a preferred embodiment, the semiconductor based photo detector is selected from a group of detectors, comprising a Photo Diode (PD), an Avalanche Photo Diode (APD) and a Silicon Drift Detector (SDD).

It has proven advantageous, if the light decay time of the scintillation crystal is larger than 100 ns, for example by using a scintillation crystal comprising $^6$LiI(Eu).

It is possible to utilize a scintillation crystal which is smaller than 2 cm$^3$, preferably smaller than 0.5 cm$^3$.

When other than thermal neutrons are to be detected with the inventive detector, it is an advantage to use a a surrounding neutron moderating medium, slowing down the fast neutrons, so that mainly thermal neutrons enter the scintillation crystal.

The invention also provides for a complete detector system, comprising a neutron detector as described in combination with sampling electronics and a computer program, capable of evaluating the measured and sampled data, especially being capable of performing a pulse shape analysis of said data.

It is even more preferable to combine such a neutron detector, which can be realized in a very tiny setup, with other radiation detectors, for example with a γ-detector designed for spectroscopy. Such a combined detector is especially useful for the purposes of homeland security, as it can be used as handheld radioisotope identifier.

It is even possible to exploit the neutron detector provided by the invention as a γ-detector, since the scintillator detects y radiation as well.

BRIEF DESCRIPTION OF THE DRAWINGS

A specific example of the invention is described in the following:

FIG. 3 shows a two-dimensional spectrum utilizing pulse shape discrimination of the signals.

DETAILED DESCRIPTION OF THE INVENTION

Figure 1:
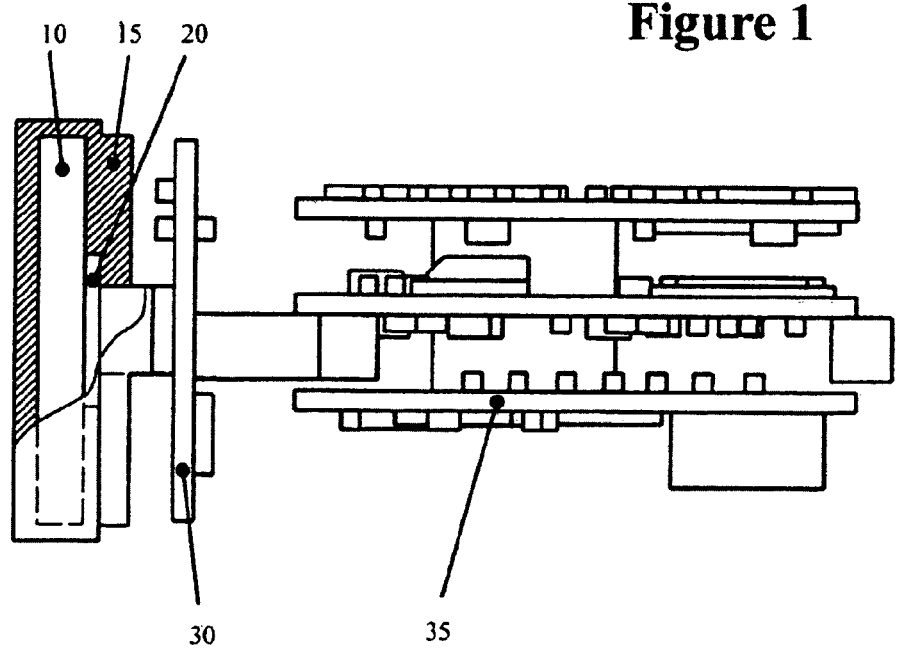
FIG. 1 shows the principle setup of a detector.

FIG. 1 shows the schematic setup of the detector according to this embodiment. A $^6$LiI(Eu) crystal 10 is connected to a semiconductor photo diode 20. Neutrons, entering the $^6$LiI (Eu) crystal, are captured by the $^6$Li ions. The reaction products, an α-particle and a tritium particle, are completely stopped in the scintillator crystal 10 thereby generating excited states in that crystal. Those excited states decay with a decay time in the order of 1 μs.

The emitted light is then collected by the photo detector 20 which again outputs an electric signal, this signal being directed to the preamplifier 30 and then to an electronic unit 35, this electronic unit 35 being responsible for the sampling and the pulse height and pulse shape analysis of the preamplifier output signals.

In order to allow for the detection of other than thermal neutrons, the $^6$LiI(Eu) crystal 10 is surrounded by a moderator 15. This moderator 15 slows faster neutrons down to thermal energies so that they could be captured and therefore detected by the $^6$LiI(Eu) crystal 10.

The scintillator crystal 10 also reacts to γ-radiation, being scattered or stopped within the crystal, thus generating scintillation light, being detected by the photo detector 20 also.

As the material used in the scintillator crystal 10 is selected so that the light output, corresponding to the capture of slow (thermal) neutrons is equivalent to the light output, generated by γ-energy measurement with a γ-energy of more than 3 MeV and as, at the same time, γ-radiation, emitted from natural radionuclide sources, has an energy of less than 3 MeV, those two signals can be clearly separated by pulse height analysis.

Figure 2:
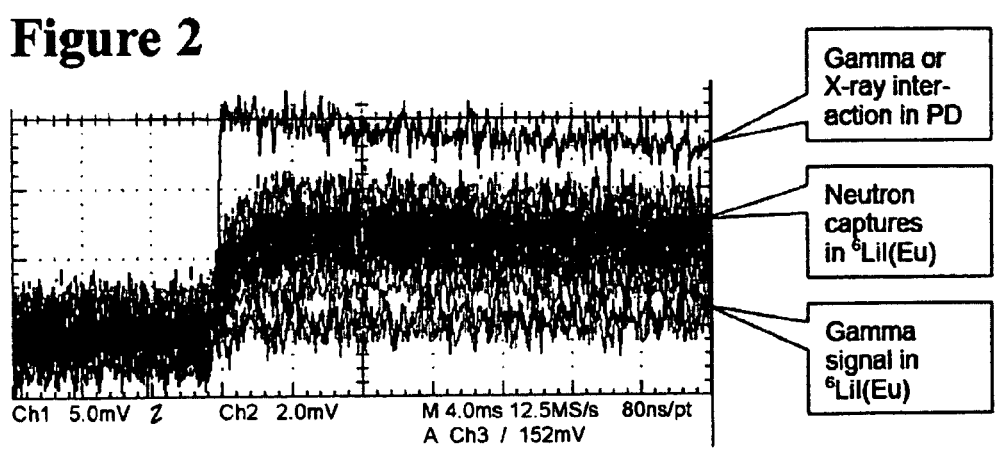
FIG. 2 shows signals measured by such a detector.

The γ-signal in $^6$LiI(Eu), which can be seen in FIG. 2, can be clearly distinguished from the neutron capture signal in $^6$LiI(Eu) by its energy.

The semiconductor photo detector 20, that is the photo diode in the present embodiment, does not stop significant amounts of slow neutrons, but is, as all semiconductor devices, a γ-radiation detector also. The signals resulting from those γ-radiation, interacting with the photo diode 20 directly, are shown in FIG. 2 also. Even if they generally seem to have a higher energy as the captured neutron signals, they nevertheless do produce a significant noise with regard to the neutron capture signals 50. This can be seen from the spectrum of FIG. 3, discussed below.

To meet the ANSI and other (e.g. IAEA) standards for neutron sensitivity in handheld radionuclide identification devices it is necessary to derive neutron alarms from single neutron counts, e.g. if two neutrons are detected within a time period of 5 seconds. Therefore, a secure and robust detection of neutrons and therefore a save distinguishing of neutron signals from background is required.

In detectors as known from the state of the art, the photo detector is a photomultiplier, being not sensitive to γ-radiation. Nevertheless, such a photomuliplier is a complex and especially large device, not suitable for handheld detectors.

The invention as described in this embodiment makes use of the physical effect that the charge collection time in the photo diode 20 is smaller than the light decay time in the scintillator crystal 10. Therefore, the output signals of the photo detector 20 do show a different pulse shape when comparing their timing information.

The present invention utilizes this effect and distinguishes the neutron induced signals from the scintillator crystal and the γ-induced signals from the photo diode by such a pulse shape analysis. As, at the same time, the neutron induced signals in the scintillator and the γ-induced signals in the scintillator can be distinguished by pulse height analysis, all three types of signals can be distinguished when combining pulse height and pulse shape analysis.

Pulse shape analysis can be done in analog and digital electronics. As such a pulse shape analysis in analog electronics is fairly complicated, therefore leading to complicated and expensive devices within the detector, the embodiment provides a signal sampling device, digitizing the output signal of the photo detector.

The further evaluation of the resulting sampled digital signal is then done with a digital signal processing device, capable of performing such a pulse shape analysis.

A two-dimensional plot, showing the output signals after pulse shape analysis, is shown in FIG. 3.

The x-axis depicts the energy of the measured signals, whereas the y-axis is a measure for the pulse shape. The neutron induced signals 50 can be clearly distinguished from the γ-induced signals 40 from the scintillator, the γ-induced signals in the photo diode 60 and the background noise 70.

As mentioned above already, the γ-induced signals in the photo diode 60 generally seem to have a higher energy than the neutron induced signals 50, but still a significant number of signals of the γ-induced signals in the photo diode 60 seem to have the same energy then the neutron induced signals 50. As the above cited to ANSI standard does require the robust detection of single neutrons, such a γ-noise is not acceptable for respective devices. Therefore, the detector according to the invention combines pulse height and pulse shape analysis for those signals, thereby allowing for discrimination of both, γ-induced signals 40 from the scintillator and γ-induced signals from the photo diode 60.

The detector according to the present embodiment has to be calibrated before using it for the first time, including setting a window on the signals, resulting from γ-radiation absorbed by the photo diode, discriminating against those signals. The resulting spectrum then only contains signals, produced by light emitted from the scintillator crystal 10, that is signals resulting from γ- and neutron radiation absorbed in said crystal.

Setting a pulse height window on the neutron spot 50 in FIG. 3, the then resulting signal contains neutron induced signals only, after all γ-induced signals from the photo diode 60 have been discriminated.

As a result, the inventive combination of a suitable scintillator crystal with a semiconductor photo detector, for example a photo diode or an avalanche photo diode or the like, in combination with a sampling device and a digital electronics, being capable of performing a pulse height and a pulse shape analysis, results in a very small, compact and robust detector for neutron detection. As this detector does not contain gas under pressure, it can easily be transported in airplanes also.

Experiments have shown that a $^6$LiI(Eu) crystal with a volume less than ½ ccm is sufficient to comply with the ANSI standards for the detection of slow neutrons. Therefore, the detector according to this invention is a significant step in the direction of further miniaturization and variability of handheld radio isotope identification devices.

The invention claimed is:

1. Neutron detector for detection of neutrons in fields with significant γ- or β-radiation, comprising
    a neutron sensitive scintillator crystal, adapted to provide a neutron capture signal being larger than the capture signal of 3 MeV γ-radiation,
    a semiconductor based photo detector being optically coupled to the scintillator crystal and adapted to generate a detector signal, where the scintillator crystal and the semiconductor based photo detector are selected so that the total charge collection time for scintillator signals in the semiconductor based photo detector is larger than the total charge collection time for signals generated by direct detection of ionizing radiation in the semiconductor based photo detector,
    electronic circuitry adapted to sample the detector signals, and
    a digital signal processing device, wherein the digital signal processing device is adapted to
        distinguish direct signals from the semiconductor based photo detector, cause by γ- or β-radiation and being at least partially absorbed in the semiconductor based photo detector, from light signals entering the semiconductor based photo detector, after being emitted from the scintillator crystal after capturing at least one neutron, by means of pulse shape discrimination, utilizing a difference between the total charge collection time for scintillator signals generated by direct detection of ionizing radiation in the semiconductor based photo detector, and
        distinguish neutron induced signals from γ-radiation induced signals in the scintillator crystal by discriminating the different signals via their pulse height, making use of the difference between the number of photons generated by neutron and γ-radiation in the field of interest.

2. Neutron detector according to claim 1, characterized in that the semiconductor based photo detector is a Silicon Drift Detector (SDD).

3. Neutron detector according to claim 1, characterized in that the light decay time of the scintillation crystal is larger than 100 ns.

4. Neutron detector according to claim 1, characterized in that the scintillation crystal comprises $^6$LiI(Eu).

5. Neutron detector according to claim 1, characterized in that the semiconductor based photo detector is selected from a group of detectors, comprising a Photo Diode (PD) and an Avalanche Photo Diode (APD).

6. Neutron detector according to claim 1, characterized in that the scintillation crystal is smaller than 2 cm$^3$, preferably smaller than 0.5 cm$^3$.

7. Neutron detector according to claim 1 with a surrounding neutron moderating medium.

8. Neutron detector according to claim 2 with a surrounding neutron moderating medium.

9. Neutron detector according to claim 3 with a surrounding neutron moderating medium.

10. Neutron detector according to claim 4 with a surrounding neutron moderating medium.

11. Neutron detector according to claim 5 with a surrounding neutron moderating medium.

12. Neutron detector according to claim 6 surrounding neutron moderating medium.

* * * * *